No. 703,720. Patented July 1, 1902.
J. E. DUNN.
ARTIFICIAL DENTURE.
(Application filed Mar. 18, 1902.)
(No Model.)

Witnesses:
W. H. Cotton
Arthur B. Seibold

By

Inventor:
J. Elwood Dunn
Louis K. Gillson Atty.

UNITED STATES PATENT OFFICE.

JAMES ELWOOD DUNN, OF CHICAGO, ILLINOIS.

ARTIFICIAL DENTURE.

SPECIFICATION forming part of Letters Patent No. 703,720, dated July 1, 1902.

Application filed March 18, 1902. Serial No. 98,836. (No model.)

*To all whom it may concern:*

Be it known that I, JAMES ELWOOD DUNN, a citizen of the United States, and a resident of Chicago, county of Cook, and State of Illinois, have invented certain new and useful Improvements in Dentures, of which the following is a specification, and which are illustrated in the accompanying drawings, forming a part thereof.

This invention relates to improvements in dental plates or dentures; and it has for its object to provide simple and effective means for removably securing partial plates in the mouth.

The invention consists in providing the first bicuspid or any other available natural tooth at each side of the jaw with an inward extension or projection under or against which the plate provided with the teeth to be supplied is sprung and held from working loose, although it may be readily detached for cleaning or other purposes by simply compressing the plate.

The invention further consists of the arrangement and combination of parts hereinafter fully described, particularly designated in the claims, and which are illustrated in the accompanying drawings, in which—

Figure 1:
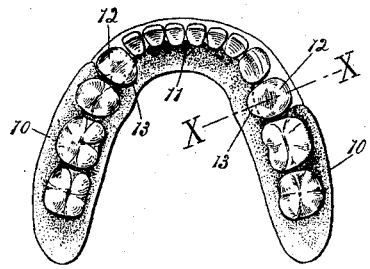
Figure 2:
Figure 5:
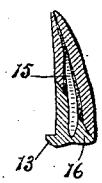
Figure 3:
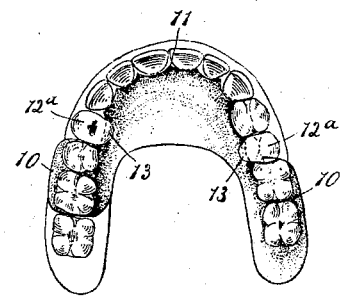
Figure 4:
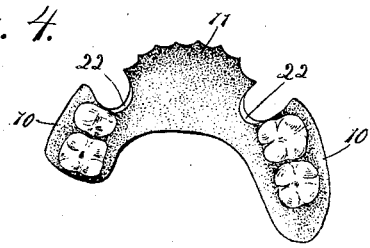

Figure 1 is a view of a set of teeth of the lower jaw, showing a partial plate constructed in accordance with my invention and supplying four molars and a bicuspid. Fig. 2 is a section on the line $xx$ of Fig. 1. Fig. 3 is a view of a set of the upper-jaw teeth, three molars and one bicuspid of which are supplied by a partial plate. Fig. 4 illustrates the plate shown in Fig. 3 and removed from the jaw. Fig. 5 is a section through an upper tooth provided with another form of crown having an extension for engaging and holding the plate in position in the mouth; and Fig. 6 illustrates a further manner of providing a tooth with the extension or projection.

The plate consists of side portions 10, designed to fit over or under the gum where the teeth are out and to be provided with the teeth to be supplied in the jaw, and a connecting portion 11, adapted to fit in behind the remaining front teeth. This plate is required to be somewhat elastic, and it may be made of gutta-percha or of any other suitable material used for platework. To secure it in place, a natural tooth on each side of the jaw, and preferably the first one in front of the teeth being supplied, as 12 in Fig. 1 and 12ª in Fig. 3, is provided with an inward extension or projection 13, under or against which the sides of the plate are designed to be moved and held by reason of the elasticity of the plate.

The extensions for holding the plate may be formed, as shown in Fig. 2, on a crown 14, cemented to the tooth in the usual manner, or, as shown in Fig. 5, where is illustrated a bicuspid, the extension may be made of a double half-crown. In this case the platinum pin 15, to which the crown 16 is fixed, is driven into the nerve-canal of the tooth, the nerve having previously been devitalized and removed.

Figure 6:
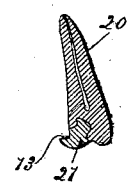

In Fig. 6 the tooth (designated 20) is provided with a cavity on the inner side, and a filling or cast cusp 21 is placed therein and so shaped as to provide the extension 13. The extensions for engaging and holding the plate may be made in a great variety of ways, and their formation and the manner of securing them in place will depend on existing conditions—that is to say, as to the location of the teeth to be supplied and the character of the teeth to be used for anchorage.

The invention may be used in securing partial plates for the upper jaw as well as the lower jaw, an upper-jaw plate being shown in Figs. 3 and 4 and provided with two molars on one side and a molar and bicuspid on the other.

In building up the plate a cast is taken in plaster of the mouth after the anchorage extensions have been secured in place, thereby procuring an impression of the latter, so that when the plate is made up an edge or square shoulder, as 22, (see Fig. 4,) for engaging the extensions will be formed on the plate adjacent to the extensions.

I claim as my invention—

1. In a denture, in combination, an elastic plate conforming to the contour of the gum with which it is to be used, and having fixed thereto the teeth to be supplied, and an extension or projection on one of the natural teeth at each side of the jaw for engaging the plate when sprung into place.

2. In a denture, in combination, an elastic plate conforming to the contour of the gum with which it is to be used, and having fixed thereto the teeth to be supplied, a crown secured to a natural tooth at each side of the jaw and having an inward extension, and a shoulder at each side of the plate and adapted to fit against each extension when the plate is sprung into place.

J. ELWOOD DUNN.

Witnesses:
ARTHUR B. SEIBOLD,
LOUIS K. GILLSON.